United States Patent
Largo Del Amo et al.

(10) Patent No.: US 12,417,253 B2
(45) Date of Patent: *Sep. 16, 2025

(54) IMAGE BASED SECURE ACCESS TO WEB PAGE

(71) Applicant: Netskope, Inc., Santa Clara, CA (US)

(72) Inventors: Mariano Largo Del Amo, Leganés—Madrid (ES); Victor Jurado Martinez, Leganés—Madrid (ES)

(73) Assignee: Netskope, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/467,637

(22) Filed: Sep. 14, 2023

(65) Prior Publication Data

US 2024/0004948 A1 Jan. 4, 2024

Related U.S. Application Data

(63) Continuation of application No. 17/541,124, filed on Dec. 2, 2021, now Pat. No. 11,797,636, which is a
(Continued)

(30) Foreign Application Priority Data

May 17, 2016 (EP) ..................... 16382216

(51) Int. Cl.
*G06F 16/955* (2019.01)
*G06F 16/957* (2019.01)
(Continued)

(52) U.S. Cl.
CPC ...... *G06F 16/9577* (2019.01); *G06F 16/9574* (2019.01); *G06F 16/958* (2019.01);
(Continued)

(58) Field of Classification Search
None
See application file for complete search history.

(56) References Cited

U.S. PATENT DOCUMENTS 5,440,723 A 8/1995 Arnold et al.
6,069,628 A * 5/2000 Farry ..................... G06F 9/451
715/835

(Continued)

FOREIGN PATENT DOCUMENTS

CN 102375878 A 3/2012
EP 1063833 A2 12/2000
(Continued)

OTHER PUBLICATIONS

Martin, Victoria "Cooperative Security Fabric," The Fortinet Cookbook, Jun. 8, 2016, 6 pgs., archived Jul. 28, 2016 at https://web.archive.org/web/20160728170025/http://cookbook.fortinet.com/cooperative-security-fabric-54.

(Continued)

*Primary Examiner* — Maikhanh Nguyen
(74) *Attorney, Agent, or Firm* — MUGHAL GAUDRY & FRANKLIN PC

(57) ABSTRACT

An intermediary server provides secure access to a web page of a web-based service to a client terminal upon request of a web server. The intermediary server includes an operating system that runs an instance of a web browser engine, which is configured to produce an image of the web page rendered in the instance of the web browser engine. The web browser engine transmits an access web page to a web browser of the client terminal. The access web page is configured to retrieve the image from the web browser engine and display the image in the web browser. User interactions are registered and sent to the instance in the intermediary server. The user interactions are reproduced within the instance and the
(Continued)

instance produces images of the web page after each of the user interactions.

18 Claims, 3 Drawing Sheets

Related U.S. Application Data continuation of application No. 16/301,869, filed as application No. PCT/EP2017/061899 on May 17, 2017, now Pat. No. 11,232,167.

(51) Int. Cl.
*G06F 16/958* (2019.01)
*H04L 9/40* (2022.01)
*H04L 67/02* (2022.01)
*H04L 67/56* (2022.01)
*H04L 67/565* (2022.01)

(52) U.S. Cl.
CPC .......... *H04L 63/1466* (2013.01); *H04L 67/02* (2013.01); *H04L 67/56* (2022.05); *H04L 67/565* (2022.05)

(56) References Cited

U.S. PATENT DOCUMENTS

| | | | |
|---|---|---|---|
| 6,073,241 A * | 6/2000 | Rosenberg | H04L 67/02 726/3 |
| 6,513,122 B1 | 1/2003 | Magdych et al. | |
| 6,535,931 B1 * | 3/2003 | Celi, Jr. | G06F 3/023 710/21 |
| 6,622,248 B1 | 9/2003 | Hirai | |
| 7,080,408 B1 | 7/2006 | Pak et al. | |
| 7,298,864 B2 | 11/2007 | Jones | |
| 7,376,719 B1 | 5/2008 | Shafer et al. | |
| 7,735,116 B1 | 6/2010 | Gauvin | |
| 7,966,654 B2 | 6/2011 | Crawford | |
| 8,000,329 B2 | 8/2011 | Fendick et al. | |
| 8,103,543 B1 * | 1/2012 | Zwicky | G06Q 30/02 709/224 |
| 8,296,178 B2 | 10/2012 | Hudis et al. | |
| 8,793,151 B2 | 7/2014 | DelZoppo et al. | |
| 8,838,992 B1 * | 9/2014 | Zhu | G06F 21/563 713/186 |
| 8,839,417 B1 | 9/2014 | Jordan | |
| 8,856,263 B2 | 10/2014 | Fainberg et al. | |
| 9,197,601 B2 | 11/2015 | Pasdar | |
| 9,225,734 B1 | 12/2015 | Hastings | |
| 9,231,968 B2 | 1/2016 | Fang et al. | |
| 9,280,678 B2 | 3/2016 | Redberg | |
| 9,811,662 B2 | 11/2017 | Sharpe et al. | |
| 9,959,694 B2 | 5/2018 | Lindsay | |
| 10,084,825 B1 | 9/2018 | Xu | |
| 10,237,282 B2 | 3/2019 | Nelson et al. | |
| 10,334,442 B2 | 6/2019 | Vaughn et al. | |
| 10,382,468 B2 | 8/2019 | Dods | |
| 10,430,866 B2 | 10/2019 | Glass et al. | |
| 10,484,334 B1 | 11/2019 | Lee et al. | |
| 10,506,077 B2 | 12/2019 | Dimitrov | |
| 10,642,448 B2 | 5/2020 | Park | |
| 10,728,239 B2 | 7/2020 | Maylor et al. | |
| 10,826,941 B2 | 11/2020 | Jain et al. | |
| 11,032,301 B2 | 6/2021 | Mandrychenko et al. | |
| 11,036,856 B2 | 6/2021 | Graun et al. | |
| 11,146,520 B2 | 10/2021 | Lieb et al. | |
| 11,232,167 B2 * | 1/2022 | Largo Del Amo | H04L 63/1466 |
| 11,281,775 B2 | 3/2022 | Burdett et al. | |
| 11,563,766 B2 | 1/2023 | Petry et al. | |
| 11,797,636 B2 * | 10/2023 | Largo Del Amo | H04L 67/02 |
| 2002/0099666 A1 | 7/2002 | Dryer et al. | |
| 2003/0055994 A1 | 3/2003 | Herrmann et al. | |
| 2003/0063321 A1 | 4/2003 | Inoue et al. | |
| 2003/0065926 A1 * | 4/2003 | Schultz | G06F 21/562 713/188 |
| 2003/0172292 A1 | 9/2003 | Judge | |
| 2003/0204632 A1 | 10/2003 | Willebeek-LeMair et al. | |
| 2004/0015719 A1 | 1/2004 | Lee et al. | |
| 2004/0064736 A1 * | 4/2004 | Obrecht | G06F 21/566 726/24 |
| 2005/0010593 A1 | 1/2005 | Fellenstein et al. | |
| 2005/0251856 A1 * | 11/2005 | Araujo | H04L 63/123 726/12 |
| 2005/0271246 A1 | 12/2005 | Sharma et al. | |
| 2006/0075494 A1 * | 4/2006 | Bertman | G06F 21/566 726/22 |
| 2006/0156401 A1 | 7/2006 | Newstadt et al. | |
| 2007/0204018 A1 | 8/2007 | Chandra et al. | |
| 2007/0237147 A1 | 10/2007 | Quinn et al. | |
| 2008/0069480 A1 | 3/2008 | Aarabi et al. | |
| 2008/0134332 A1 | 6/2008 | Keohane et al. | |
| 2008/0208868 A1 * | 8/2008 | Hubbard | G06F 16/9535 |
| 2008/0229419 A1 * | 9/2008 | Holostov | G06F 21/564 726/24 |
| 2009/0144818 A1 | 6/2009 | Kumar et al. | |
| 2009/0249470 A1 | 10/2009 | Litvin et al. | |
| 2009/0300351 A1 | 12/2009 | Lei et al. | |
| 2010/0005165 A1 * | 1/2010 | Sinclair | H04L 67/02 709/223 |
| 2010/0017436 A1 | 1/2010 | Wolge | |
| 2010/0125913 A1 * | 5/2010 | Davenport | H04L 63/1466 726/25 |
| 2011/0119481 A1 | 5/2011 | Auradkar et al. | |
| 2011/0145594 A1 | 6/2011 | Jho et al. | |
| 2012/0278896 A1 | 11/2012 | Fang et al. | |
| 2013/0159694 A1 | 6/2013 | Chiueh et al. | |
| 2013/0212465 A1 | 8/2013 | Kovatch | |
| 2013/0298190 A1 | 11/2013 | Sikka et al. | |
| 2013/0347085 A1 | 12/2013 | Hawthorn et al. | |
| 2014/0013112 A1 | 1/2014 | Cidon et al. | |
| 2014/0068030 A1 | 3/2014 | Chambers et al. | |
| 2014/0068705 A1 | 3/2014 | Chambers et al. | |
| 2014/0095863 A1 * | 4/2014 | Liu | H04L 63/0428 713/153 |
| 2014/0259093 A1 | 9/2014 | Narayanaswamy et al. | |
| 2014/0282843 A1 | 9/2014 | Buruganahalli et al. | |
| 2014/0359282 A1 | 12/2014 | Shikfa et al. | |
| 2014/0366079 A1 | 12/2014 | Pasdar | |
| 2015/0046789 A1 * | 2/2015 | Wei | G06F 40/14 715/234 |
| 2015/0100357 A1 | 4/2015 | Seese et al. | |
| 2015/0172310 A1 * | 6/2015 | Saxena | H04L 63/1441 726/22 |
| 2016/0323318 A1 | 11/2016 | Terrill et al. | |
| 2016/0350145 A1 | 12/2016 | Botzer et al. | |
| 2017/0064005 A1 | 3/2017 | Lee | |
| 2017/0093917 A1 | 3/2017 | Chandra et al. | |
| 2017/0250951 A1 | 8/2017 | Wang et al. | |
| 2020/0050686 A1 | 2/2020 | Kamalapuram et al. | |

FOREIGN PATENT DOCUMENTS

| | | | | |
|---|---|---|---|---|
| EP | 2031820 A1 | 3/2009 | | |
| WO | 0135259 A2 | 5/2001 | | |
| WO | 2011001945 A1 | 1/2011 | | |
| WO | WO-2013079113 A1 * | 6/2013 | ....... | G06F 17/30864 |
| WO | 2013159721 A1 | 10/2013 | | |
| WO | 2018066426 A1 | 4/2018 | | |
| WO | 2020199091 A1 | 10/2020 | | |

OTHER PUBLICATIONS

Huckaby, Jeff Ending Clear Text Protocols, Rackaid.com, Dec. 9, 2008, 3 pgs.

Nevvton, Harry "fabric," Newton's Telecom Dictionary, 30th Updated, Expanded, Anniversary Edition, 2016, 3 pgs.

Fortinet, "Fortinet Security Fabric Earns 100% Detection Scores Across Several Attack Vectors in NSS Labs' Latest Breach Detection Group Test [press release]", Aug. 2, 2016, 4 pgs, available at

(56) References Cited

OTHER PUBLICATIONS https://www.fortinet.com/de/corporate/about-us/newsroom/press-releases/2016/security-fabric-earns-100-percent-breach-detection-scores-nss-labs.

Fortinet, "Fortinet Security Fabric Named 2016 CRN Network Security Product of the Year [press release]", Dec. 5, 2016, 4 pgs, available at https://www.fortinet.com/corporate/about-US/newsroom/press-releases/2016/fortinet-security-fabric-named-2016-crn-network-security-product.

McCullagh, Declan, "How safe is instant messaging? A security and privacy survey," CNET, Jun. 9, 2008, 14 pgs.

Beck et al. "IBM and Cisco: Together for a World Class Data Center," IBM Redbooks, Jul. 2013, 654 pgs.

Martin, Victoria "Installing internal FortiGates and enabling a security fabric," The Fortinet Cookbook, Jun. 8, 2016, 11 pgs, archived Aug. 28, 2016 at https://web.archive.org/web/20160828235831/http://cookbook.fortinet.com/installing-isfw-fortigate-enabling-csf-54.

Zetter, Kim, "Revealed: The Internet's Biggest Security Hole," Wired, Aug. 26, 2008, 13 pgs.

Adya et al., Farsite: Federated, available, and reliable storage for an incompletely trusted environment, SIGOPS Oper. Syst. Rev. 36, SI, Dec. 2002, pp. 1-14.

Agrawal et al., "Order preserving encryption for numeric data," In Proceedings of the 2004 ACM SIGMOD international conference on Management of data, Jun. 2004, pp. 563-574.

Balakrishnan et al., "A layered naming architecture for the Internet," ACM SIGCOMM Computer Communication Review, 34(4), 2004, pp. 343-352.

Downing et al. , Naming Dictionary of Computer and Internet Terms, (11th Ed.) Barron's, 2013, 6 pgs.

Downing et al., Dictionary of Computer and Internet Terms, (10th Ed.) Barron's, 2009, 4 pgs.

Zoho Mail, "Email Protocols: What they are & their different types," 2006, 7 pgs. available at https://www.zoho.com/mail/glossary/email-protocols.html#:~:text=mode of communication.-,What are the different email protocols%3F, and also has defined functions.

NIIT, Special Edition Using Storage Area Networks, Que, 2002, 6 pgs.

Chapple, Mike, "Firewall redundancy: Deployment scenarios and benefits," Tech Target, 2005, 5 pgs. available at https://www.techtarget.com/searchsecurity/tip/Firewall-redundancy-Deployment-scenarios-and-benefits?%20Offer=abt_pubpro_AI-Insider.

Fortinet, FortiGate—3600 User Manual (vol. 1 , Version 2.50 MR2) Sep. 5, 2003, 329 pgs.

Fortinet, FortiGate SOHO and SMB Configuration Example, (Version 3.0 MR5), Aug. 24, 2007, 54 pgs.

Fortinet, FortiSandbox—Administration Guide, (Version 2.3.2), Nov. 9, 2016, 191 pgs.

Fortinet, FortiSandbox Administration Guide, (Version 4.2.4) Jun. 12, 2023, 245 pgs. available at https://fortinetweb.s3.amazonaws.com/docs.fortinet.com/v2/attachments/fba32b46-b7c0-11ed-8e6d-fa163e15d75b/FortiSandbox-4.2.4-Administration_Guide.pdf.

Fortinet,FortiOS—Administration Guide, (Versions 6.4.0), Jun. 3, 2021, 1638 pgs.

Heady et al., "The Architecture of a Network Level Intrusion Detection System," University of New Mexico, Aug. 15, 1990, 21 pgs.

Kephart et al., "Fighting Computer Viruses," Scientific American (vol. 277, No. 5) Nov. 1997, pp. 88-93.

Wang, L., Chapter 5: Cooperative Security in D2D Communications, "Physical Layer Security in Wireless Cooperative Networks," 41 pgs. first online on Sep. 1, 2017 at https://link.springer.com/chapter/%2010.1007/978-3-319-61863-0_5.

Lee et al., "A Data Mining Framework for Building Intrusion Detection Models," Columbia University, n.d. 13 pgs.

Merriam-Webster Dictionary, 2004, 5 pgs.

Microsoft Computer Dictionary, (5th Ed.), Microsoft Press, 2002, 8 pgs.

Microsoft Computer Dictionary, (4th Ed.), Microsoft Press, 1999, 5 pgs.

Mika et al. "Metadata Statistics for a Large Web Corpus," LDOW2012, Apr. 16, 2012, 6 pgs.

Oxford Dictionary of Computing (6th Ed.), 2008, 5 pgs.

Paxson, Vern, "Bro: a System for Detecting Network Intruders in Real-Time," Proceedings of the 7th USENIX Security Symposium, Jan. 1998, 22 pgs.

Fortinet Inc., U.S. Appl. No. 62/503,252, "Building a Cooperative Security Fabric of Hierarchically Interconnected Network Security Devices." n.d., 87 pgs.

Song et al., "Practical techniques for searches on encrypted data," In Proceeding 2000 IEEE symposium on security and privacy. S&P. 2000, May 2000, pp. 44-55.

Dean, Tamara, Guide to Telecommunications Technology, Course Technology, 2003, 5 pgs.

U.S. Appl. No. 60/520,577, "Device, System, and Method for Defending a Computer Network," Nov. 17, 2003, 21 pgs.

U.S. Appl. No. 60/552,457, "Fortinet Security Update Technology," Mar. 2004, 6 pgs.

Tittel, Ed, Unified Threat Management For Dummies, John Wiley & Sons, Inc., 2012, 76 pgs.

Fortinet, FortiOS Handbook: UTM Guide (Version 2), Oct. 15, 2010, 188 pgs.

Full Definition of Security, Wayback Machine Archive of Merriam-Webster on Nov. 17, 2016, 1 pg.

Definition of Cooperative, Wayback Machine Archive of Merriam-Webster on Nov. 26, 2016, 1 pg.

Pfaffenberger, Bryan, Webster's New World Computer Dictionary, (10th Ed.), 2003, 5 pgs.

\* cited by examiner

IMAGE BASED SECURE ACCESS TO WEB PAGE

PRIORITY

This application is a continuation of U.S. application Ser. No. 17/541,124, filed Dec. 2, 2021, which is a continuation of U.S. application Ser. No. 16/301,869, filed Nov. 15, 2018, now U.S. Pat. No. 11,232,167, issued Jan. 25, 2022, which is a National Phase Application of International Application No. PCT/EP2017/061899, filed May 17, 2017, which claims the benefit of and priority to EP Application No. 16382216.6, filed May 17, 2016. All of these applications are hereby expressly incorporated by reference in their entirety.

TECHNICAL FIELD

The present disclosure relates to a server for providing secure access to a web page of a web-based service, and a method for providing secure access to a web page.

BACKGROUND

The number of devices with Internet connectivity has dramatically increased in the last decade, and it is expected that the number will keep growing in the future since Internet access is not only restricted to landline connections, so devices other than personal computers (PCs) may have access to the Internet as well. In this regard, mobile communication systems have had a huge impact on the Internet connectivity: virtually any wireless device including an antenna for mobile communications may now connect to the Internet.

The Internet has also evolved in what regards the accessible content on the network. Now, Internet-based services may even replace traditional software since several online applications offer similar capabilities and are available inside a standard web browser. In this sense, many applications and websites offer services or provide enhanced features when personal data is introduced. These services are, for instance, purchasing stuff like clothes, books, music, among others, performing bank transactions, writing and reading emails or documents, etc.

So a user may benefit from many of these services, but there are always security concerns: malicious applications and techniques which have the sole purpose of stealing, modifying and/or erasing data, give rise to phenomena such as phishing, spoofing, browser hijacking, etc., for the personal profit of an attacker.

Although there are many types of malicious attacks, one of the most common ways of getting infected is by browsing web pages on the Internet. Albeit software such as firewalls, antivirus, antimalware toolkits, etc., exist for preventing infection of the user device, said applications are not capable of detecting, stopping and removing many of the infections. Thus, even with these applications, a user is still prone to getting infected.

One of the biggest threats to which a user is exposed when its computer or web browser is infected is that his/her personal data may be stolen. This may occur in devices infected with malware that serves false versions of the website currently browsed, i.e. website spoofing, tricking the user into entering his/her login information which is then sent to the attacker. Thanks to this information, the attacker may then gain access to personal accounts in the original website, e.g. an email provider, a banking service, an e-commerce, etc. Such attack may also consist in stealing different sensitive information like credit card data or social security number.

Another threat is malware that tampers with the information introduced in the forms in a transparent manner for the user (he/she does not appreciate any visible changes of the data) resulting in, for instance, different email content being sent, money being wired to a different bank account number, etc.

There have been some attempts in the prior art to address some of these situations with the use of a server that allegedly sends clean versions of websites so that, in principle, the user may browse websites with a lower risk of getting infected.

U.S. patent application publication US 2014/0283071 A1 relates to a system and a method for isolating malware of an application with the use of a remote application physically separate from the client. An isolation encoding module creates re-encoded secure versions of the content of the remote application, for instance a website visited with a web browser, so that the client downloads a malware-free version of the website. The remote application may be VM-based (i.e. virtual machine), thus many resources may be necessary to serve a single remote application and/or a single client. US 2014/0283071 A1 is silent on how to prevent malicious attacks when malware is already present in the client machine or web browser, therefore data may still be tampered with and/or stolen.

International patent application publication no. WO 2013/079113 A1 is directed to a secure cloud browsing client-server system and method of using the same. A server transmits an executable file to be run on a client device in response to a request made by the client for browsing the internet. The executable file establishes a communication between the client and the server. The server, in turn, creates an instance of a container, which then creates a browsing instance comprising a remote browser that downloads a web page, renders it, and sends it to the client in the form of an image. The instances of containers—of a container-based virtualization system—, thus, may be created after the executable file is downloaded and executed in the client after the client has made the corresponding request. A Monitoring Manager monitors each of these instances and detects whether it is necessary to apply additional security measures, or to move some instances to other servers in order to minimize the risk that an attacker may get access to the server.

The use of virtualization techniques for achieving isolation between instances limits the amount of concurrent sessions or instances that a server may cope with, since a significant amount of resources is put in running the whole virtual machine or container.

Further, the use of additional files that must be executed in the client device restricts the scope of secure browsing to those devices in which said files may be executed. This approach includes other problems such as that the user shall have permission or privileges to execute them, and that any antivirus and/or firewall that may be installed in the client device does not consider the files to be a threat and tags them as not malicious. Since user interactions like keystrokes and mouse displacements are transmitted to a server, the file may be flagged as a malicious key logging application.

In addition, the company providing a service that may be secured and which is accessible on line via a web browser can be held liable for running software in the client device with or without his/her consent. The software may be breached thereby providing a backdoor through which the user may be attacked; so an attempt to provide secure access to a service on the Internet exposes the client to other malicious attacks.

Another important aspect for any user is that not having a completely transparent implementation of a secure browsing system is detrimental in terms of user experience and/or level of confidence in that the browsed website may not be legit.

BRIEF SUMMARY

The server and method for providing secure access to web-based services disclosed in the present disclosure intend to solve the problems and shortcomings of secure browsing systems and methods of the prior art.

A first aspect of the disclosure relates to an intermediary server for providing secure access to a web page of a web-based service to a client terminal upon request of one of a web server and a client terminal, the client terminal comprising a web browser, the intermediary server comprising:

an operating system configured to run an instance of a web browser engine;
the web browser engine is configured to produce an image of the web page rendered in the instance of the web browser engine, and to transmit an access web page to the web browser of the client terminal; and
the access web page is configured to retrieve the image from the web browser engine, and to display the image in the web browser.

The intermediary server advantageously provides safe and reliable connection and interaction with a web-based Internet service that may involve the exchange of sensitive information, for instance, but not limited to, a banking website, an electronic commerce, an email service, other particular web pages asking for user credentials, etc.

When a website asks for user credentials, for example in the form of a login with username and password or the like, the user may be exposed to the harm of key logging applications, namely key loggers. A key logger may register any input from a user and send it remotely to the person or hacker who installed the application. This is particularly critical when the user introduces his or her credentials in a login form since the hacker may potentially use this information for gaining privileged access and/or impersonate the real user. Although the criticality of the information depends on the website the client is browsing, the intermediary server may be used for browsing any web page in a safe manner.

Moreover, the intermediary server may also provide secure access to websites that may have been compromised or infected in some manner. A user or client browsing a compromised website using the intermediary server may still retrieve the content without risk that the user equipment—e.g. PC, laptop, mobile phone, smartphone, tablet, smart TV, video game console, and generally any electronic device comprising a web browser application—will get infected with virus, malware or the like.

The operating system comprises a web browser engine, that is an application configured to render content in markup language—e.g. HTML, XHTML, etc.—, style sheet language—e.g. XSL, CSS, etc.—, and additional content of a web page that is visible to the user—e.g. images, videos, animations, etc.—, so that it may be displayed to a user. The web browser engines mainly perform the functions of rendering web content, hence they are also known as rendering engines. A web browser engine is one of the many components that a web browser comprises.

When the intermediary server has to provide secure access to a web page, the operating system runs an instance of the web browser engine. This instance loads the URL, i.e. uniform resource locator, to be accessed, downloads or retrieves the files from that URL which, generally, are at least: a first file with contents in markup language; style sheet files, if any, that the first file requests through the HTML or XHTML code, for example; script files, if any, that perform particular functions within the web page; and media content such as images, videos, animations, or the like, if any. Browsing websites written in languages such as PHP, ASP, CGI or the like, namely, server-side scripting languages, with the intermediary server is also possible since the code that is run in the web server is still run, and the resulting content that is to be displayed to the user—in markup language—is then rendered by the intermediary server.

The instance of the web browser engine renders the web page using the file with markup language and includes the content of any of the additional files to be shown, including additional files with markup language which may be loaded by the first file. The rendered web page is to be transmitted to a client machine in the form of an image so that the user device only renders the image itself instead of the files that are retrieved from the website. Particularly, when the user browses a web page via the intermediary server, the web browser engine transmits an access web page to the web browser in the client machine, and the web browser loads said access web page.

With the access web page, the user may browse a secure version of a web page which is provided by the intermediary server, that is, browse the web page rendering only images created at the intermediary server. So the access web page is configured to retrieve an image of a requested web page that is rendered in the instance of the web browser engine and to display it in the web browser, namely to render said image.

The access web page is also configured to send the interactions of the user with the access web page—which displays the requested web page—to the instance of the web browser engine in the intermediary server. The instance, in turn, replicates the interactions since said instance comprises the rendered web page; by replicating these interactions, the web page is browsed within the instance and, additionally, may be rendered again so that the client may see the result of his or her interactions.

In other words, when the client clicks on a hyperlink, i.e. link, on the arrows of the scrollbar, or fills a form, the mouse and keyboard events are registered by the access web page and sent to the instance in the intermediary server. All these interactions are then reproduced within the instance, so the actions are actually performed in the intermediary server, and the instance produces images of the web page after each of these interactions regardless of whether the instance renders a new web page or interacts with the already rendered web page. The access web page polls the intermediary server, and retrieves any new image of the instance so that it may be displayed in the client's web browser when the image is rendered. Therefore, the user may in fact interact with the web page even though what is shown to the user is just an image instead of the original code or content of the web page that ultimately permits user interaction.

The user, while browsing secure versions of web pages provided by the intermediary server, may avoid getting infected by malware which is present in the visited web pages: infected websites contain malicious code that, once it is downloaded in the client machine via the web browser, infects the computer if an antivirus, firewall, or an antimalware software does not stop it on time. Not only these applications are often ineffective against many malicious programs, but it is also responsibility of the user to install and keep these applications updated, so IT knowledge is a must from a user standpoint. Most of the times, the average user does not know much about computers so it is unlikely that the user is going to perform any of these tasks. Further, this may be impossible in scenarios in which the computers are maintained by a network administrator, for instance in a business environment where PCs are managed by an IT responsible or staff. Similarly, a user may be exposed to these attacks in devices with operating systems for which there are no reliable antivirus solutions. So it is the intermediary server the equipment that downloads any malicious content included in the requested web page; the intermediary server is provided with applications and mechanisms that deny possible infections that may affect its correct operation.

Although the intermediary server immunizes the user against these malicious attacks, the client machine may already be infected by the time it uses the intermediary server for browsing the Internet. This means that malware residing in the client terminal may have access to the information and content that the user is retrieving from the Internet, and send it to a hacker for his or her personal gain.

The malware may also manipulate the information downloaded so that the client sees or accesses fake or fraudulent content—e.g. fake version of a web page, addition of advertisements, etc.—, or it may manipulate the information submitted by the client—e.g. wire transfer bank account number, content or recipient address of an email, etc.—. In both cases, the intermediary server may diminish the malicious effect of the malware.

With respect to the first case, that is, malware attempting to manipulate the downloaded information, as the client's web browser downloads the access web page and a malware-free image version of a browsed web page instead of its code files and any other files—which, virtually, may be of any type—, malware in the web browser cannot recognize any information because only the access web page code is downloaded. Therefore, malware programmed to modify the downloaded web page so as to include or replace content like ads for example, cannot place the content since it does not detect the markup code it was configured to recognize and modify. So the malicious content may be added in a location which does not correspond, for instance above or below the image produced by the intermediary server, if it is added at all. In some cases, misplaced fraudulent information may not trick the users into clicking it or filling in sensitive information. Moreover, the users may suspect that the web page has been compromised (regardless of whether it happened in the web server or in their own device).

In the second case, that is, when the user is filling forms, no HTML form is present in the web browser of the client, thus malware programmed to recognize the type of forms being filled and the information entered therein, is not capable of making sense of any information since all it captures is keystrokes and mouse movements and/or events. It is in the intermediary server—within the instance—where the HTML form is filled with the user information and not in the client machine. The malware may attempt to identify the type of information that the user is inputting by analyzing the rendered images, however OCR—i.e. optical character recognition—algorithms are CPU-intensive and not completely reliable, so it is more complex for hackers to get any valuable information from an infected machine.

Similarly, this does not allow the malware to transparently change the information in the form, for instance it cannot detect when the submit button is being pressed so as to tamper with the form, e.g. write a different bank account number. The malware may intercept the keystrokes, for example, and replace them with its own characters, but it cannot detect which part of the form is currently selected, inhere is any selected at all, so it must guess what kind of information is being typed in, replace it, and expect that the user does not notice that the information appearing in the form is not the same that he/she is typing in.

In contrast to the prior art, the intermediary server does not rely on any virtualization technique. The intermediary server provides secure access to web-based Internet services by means of web browser engines instead of virtualization by means of virtual machines, also known as VMs, or operating-system-level virtualization, also known as containers.

The virtual machines and containers emulate an entire computer system and an operating system, respectively. This means that an entire operating system must be replicated to provide a virtual machine, or that part of an operating system must be replicated to provide a container. In both cases, many files must be copied and executed in order to run a web browser for providing secure access to web pages. Thus both large file space and large processing capabilities are necessary: the files must be stored somewhere in the data storage means of the server, and executed to replicate the operating system or to provide a container, which then may run a web browser. This involves a huge computational burden that has a severe impact on the processor and memory of the server, so most part of the resources in use by the server are reserved for running the virtual machine or container, and a small part of the resources is used by the web browsers, which actually provide secure access to web pages, not the virtualization system.

Moreover, creating or initiating a virtual machine or container takes some time even when most resources of the system are free, so the responsivity of the intermediary server is slow unless virtual machines or containers are created before the request arrives at the server, in which case processing power of the system is spent in a useless manner while consuming power as the wattage demanded from the power supply unit increases.

In contrast, creating a new instance of a web browser engine—which furthermore is not a fully-fledged web browser, so it requires less memory allocation and processing capabilities may take few seconds or even less than one second, so the responsivity is almost instantaneous and fast enough to be performed as soon as the request for secure access is received by the intermediary server. Therefore an intermediary server as disclosed in the present disclosure may serve more users or requests concurrently than servers using virtual machines or containers with a same machine because it demands less processing power and memory. Also, the power consumption while serving a determined number of users or requests is lower than the power consumed by servers running VMs or containers.

In addition to the reduced computational burden and data storage requirements involved in creating instances of web browser engines instead of virtual machines or virtual operating systems, an intermediary server running said web browser engines may provide protection against malicious attacks which are effective and may be even superior to those provided by containers or VMs. Particularly, different containers or VMs may isolate infections from each other, that is, when a container or VM is infected with malware, the infection might not propagate to other containers or virtual machines because they may run in an independent manner.

However, containers or virtual machines may not prevent an infection: a malicious process may be downloaded in the web browser of the container or VM and execute itself, thus becoming an active process running on the memory of the system. And since the isolation between containers or VMs is not complete, by the time the container or VM is erased after a user session has ended, the process running on the memory may have already affected other instances using the network adapters or the AP is—i.e. application programming interface—, for instance.

The intermediary server runs web browser engines which are configured to only access temporary directories that are created on initialization of the engines, and other particular directories determined by the administrator for the correct operation of the intermediary server if any. This means that the web browser engines cannot access folders or directories of the pertaining system other than these temporary directories and/or specified particular directories, and the operating system is also configured to deny any operation with files not pertaining to the temporary directories, so any attempt to create a file outside of the temporary folders is blocked.

Further, the operating system is also configured to manage which processes may be launched and be in execution and which cannot, that is, the operating system has a whitelist of processes and any process not present in the list has its execution denied. To this end, the kernel is modified so as to perform such filtering process thereby providing the operating system with the capability of managing whether a process may be launched and run or if it must be blocked. Then, in the case that malware is downloaded in an instance of the web browser engine, is stored in a temporary directory and attempts to execute itself, the operating system stops it from doing so. The operating system may also log a warning indicating an attempt to execute an application together with the URL of the web page originating the threat.

The use of a web browser engine is also advantageous for avoiding particular malware directed to attack a web browser, that is, a fully-fledged web browser which comprises a web browser engine. Many viruses may infect certain parts of a web browser like, for example, systems for syncing personal data across cross-platform web browsers, plugins, add-ons, etc. Even though only the web browser engine is used and run, the web browser engine may also be configured to implement capabilities like those included in add-ons, thereby decreasing the risk of infection.

With the intermediary server, devices with limited processing capabilities or memory may also browse web pages which are CPU-intensive or which include content not decodable by the devices like, for instance, animations, applications, etc., powered by Flash, OpenGL, or videos encoded with codecs not installed in the devices. In this case, it is the intermediary server the device which must be capable of decoding and reproducing the content, and then produce the images that will be retrieved by the access web page.

Another important aspect is that the user experience while browsing the Internet via the intermediary server must be good: the web pages must be responsive in terms of the time it takes to react to the interactions of the client and/or the time it takes to load the web page; the look and feel should be exactly the same as if the client were browsing the original web page; user sessions with or without cookies should be maintained while moving from one web page to another either by clicking on links or writing a different URL in the address bar, etc.

In this regard, the instance of the web browser engine renders the web page as it would be displayed to the user, and is then retrieved and displayed by the access web page on the client's web browser in the same way, hence the client does not see a web browser in a web browser, thus making it transparent for him/her.

The responsiveness of the access web page largely depends on the bandwidth of each of the client and the intermediary server: slow connections will take more time to interact with the web page and to retrieve new images produced by the intermediary server or the files from the web server hosting the web page. The delay that the intermediary server may introduce may be as low as few milliseconds since the time elapsed during the creation of a new instance of the web browser engine may be in the order of tens or hundreds of milliseconds.

The instance of the web browser engine may be configured to keep user sessions active until the user stops using the instance, i.e. quit browsing a web page through the intermediary server-. This means that sessions which do not use cookies may be maintained during the whole instance; the same occurs for sessions using cookies, as the files corresponding to cookies may be stored in the temporary directory and used as well.

In preferred embodiments of the disclosure, the access web page comprises JavaScript code or HTML code configured to load JavaScript code retrievable from the intermediary server.

The JavaScript code of the access web page, which is run within the web browser of the client, establishes communication with the corresponding instance of the intermediary server so that the user may safely browse a particular web page. So the JavaScript code is configured to download the rendered images of the instance over a network—e.g. the internet—to capture the keystrokes and mouse interactions of the user while he/she is browsing the access web page, and to transmit this user input to the intermediary server. Logging of the user input is confined to the tab in which the access web page is displayed if the web browser of the client is provided with tabbed web browsing, or to the window in which the access web page is displayed when the web browser does not support tabs. The JavaScript code does not register keystrokes and movements of the mouse while the tab or window is not active or in focus, that is, when the access web page is visible to the user on a screen but the user has clicked on an application different from the web browser, so the operating system has said other application in active. This does not mean that the web browser is not running because, in fact, any changes that occur in the requested web page may be shown to the user in the access web page—if the images produced at the intermediary server are retrieved—, it means that another application is registering the input of the user to perform any task that the application is configured to run.

The use of JavaScript is also advantageous in that it runs confined within the web browser. Therefore, the JavaScript code does not need that the user has administrator privileges in the operating system or the like, as long as the user may run the web browser, the JavaScript code may run as well. This, in turn, makes that the JavaScript code may only access those parts of the operating system that the web browser has access to, whereas an application that were to run outside the environment of the web browser could have access to 1 0 the registry of the operating system, system directories, dynamic-link libraries, and the like, depending on the permissions it is granted during its execution.

In addition, most web browsers are capable of running JavaScript code: the use of the intermediary server and the access web page is practically transparent to the operating system that the client equipment is using. In other words, a different implementation or application is not necessary for each operating system. As the access web page does not need to use software platforms such as Java or the like, the client is not exposed to any exploits or problems these platforms may feature.

The tasks performed by the JavaScript code described above may be programmed in one or more JavaScript codes, namely, different scripts may implement the different functionalities. The JavaScript code may be included within the access web page, or a code requesting the retrieval of one or more JavaScript codes may be included within the access web page; in the case of the latter, when the access web page is parsed by the web browser of the client, the web browser downloads and runs the JavaScript code or codes. In any case, variations in the implementations do not have any impact on the behavior or performance of the JavaScript code and are with in the scope of the disclosure.

In some embodiments, the web browser engine is further configured to sanitize keystrokes detectable by the access web page.

In some embodiments of the disclosure, the operating system is further configured to run a new instance of the web browser engine for each request for providing secure access to a web page of a web-based service.

As each instance of the web browser engine may have access to its own specific temporary folder, the instances are also isolated one from each other. Moreover, the particular way in which the intermediary server may provide secure access to web pages provides an additional layer of security to users since each request may be allocated to a new different instance. The web browser engine may be configured such that a same user browsing two different web pages does so using two independent instances, or using a same instance for browsing the two different web pages; the first configuration scheme is convenient for attaining high isolation, whereas the second configuration scheme may be advantageous from a usability standpoint in that sessions, cookies and/or any authentication means common to both web pages may be shared, e.g. several applications retrieved from an intranet. In contrast, the servers which provide said access using VMs or containers, and in order to maximize the efficiency of the resources used in creating said VMs or containers, a same user browsing two different web pages with the same server may do so with two web browsers but within the same virtual machine or container. So, even though different containers or VMs may be isolated between each other, if a container or VM is infected then all the processes within it are affected, including the two or more web browsers in use.

In some embodiments of the disclosure, the web browser engine is further configured to detect changing portions of the web page in the instance, and to produce images of the changing portions. In some of these embodiments, the access web page is further configured to retrieve the images of the changing portions from the web browser engine, and to replace portions of the image displayed in the web browser with the images of the changing portions.

The web browser engine may detect portions of the rendered web page which change over time, for instance animated images, videos, or another dynamic content like parts of the web page in AJAX, i.e. asynchronous JavaScript. The web browser engine may produce images for each of these portions, so the size of the image may be limited to the dimensions of the dynamic content.

These images may be retrieved by the access web page together with the position where they are located in the web page, and replace the portions of the rendered image with the images of the changing portions, thereby saving bandwidth that would be involved in sending an image comprising the whole web page with the changing portion, and also improving the responsiveness of the access web page.

In some of these embodiments, the web browser engine is further configured to detect the type of content that the changing portions belong to, and/or to detect the visual characteristics of the changing portions. In these embodiments, the web browser engine is further configured to select a particular image compression and/or image file format for producing the images of the changing portions.

As the instance of the web browser engine is rendering the content of the web page downloaded in markup language, the web browser engine may identify the HTML tag corresponding to a changing portion, that is, it may identify whether a portion that has changed is an image, a video, text, etc. It may also dynamically inspect, with an algorithm, the pixels of the changing portion and detect the color palette, histogram, sharpness, etc. With this information, the web browser engine may decide to apply a greater or lower compression, or no compression at all, to the produced image; similarly, it may decide to use one image file format or another, considering the characteristic compression and quality parameters of each file format. Thus the web browser engine may estimate how important is to reproduce, with more or less quality, a changing portion based on the type of content or characteristics of the portion so as to improve responsiveness and save bandwidth. In an exemplary case of a changing portion only comprising dark text on a white background, the web browser engine may produce a small-sized image using a GIF image format with a 10-color palette which may be sufficient to reproduce the text sharply.

In preferred embodiments of the disclosure, the web browser engine is configured to communicate with the web browser using HTTPS protocol.

All the information that is to be transferred between the web browser engine in the intermediary server, and the web browser in the user terminal, may use an HTTPS protocol in order to at least encrypt the interaction of the user in the access web page and the images produced in the intermediary server.

In preferred embodiments, the web browser engine is further configured to create at least one temporary directory in the operating system for each of the instance and any new instance of the web browser engine, and to permit access to the instance and any new instance to its respective at least one temporary directory of the operating system.

The intermediary server assigns to each request for secure access to web pages a new instance of the web browser engine. Each instance may be deleted once the user quits browsing the access web page or its session expires after a certain period of inactivity. The web browser engine creates a temporary folder for each of these instances so that each instance is independent and isolated from the others, and may delete a temporary folder and all its contents when the associated instance is deleted.

In preferred embodiments, the web-based service is available on the Internet, that is, web pages providing the web-based service are hosted on web servers with Internet connectivity.

In some embodiments, the web browser engine is further configured to download a file in an instance from a server different from the intermediary server, and to scan the file for virus and/or malware. In some of these embodiments, the web browser engine is further configured to serve the file to the client terminal when no virus and/or malware has been detected. In some other embodiments, the web browser engine is further configured to provide a virus and/or malware free version of the file when a virus and/or malware has been detected, and to serve the virus and/or malware free version of the file to the client terminal. In these embodiments, the access web page is further configured to download the file served by the web browser engine.

In some embodiments, the web browser engine is further configured to receive a file from the client terminal, and to scan the file for virus and/or malware. In some of these embodiments, the web browser engine is further configured to serve the file to a server different from the intermediary server when no virus and/or malware has been detected. In some other embodiments, the web browser engine is further configured to provide a virus and/or malware free version of the file when a virus and/or malware has been detected, and to serve the virus and/or malware free version of the file to the server different from the intermediary server.

So, when the user intends to download or upload a file, the intermediary server first gathers the file and scans it for malicious content, and it may either stop the file from being downloaded to the client machine or uploaded to a server if it is infected, or clean the malicious content of the file and serve the virus and/or malware free file.

Further, the intermediary server may also detect whether the access web page is object of manipulations, that is, in some embodiments the web browser engine is further configured to check the integrity of the access web page. This way, the intermediary server may know if the web browser in the client machine is infected.

A fragment or the totality of the access web page code is transmitted to the intermediary server where a hash function is applied to said code. The resulting hash value is compared with the hash value that was computed when the access web page was transmitted to the client machine. In addition, the access web page may be further configured to calculate the hash value of the sequence of keystrokes and to transmit the hash value to the intermediary server, which in turn calculates the hash value of the sequence of keystrokes received and compares it with the hash value received. If malware has manipulated the data introduced by the user, the intermediary server would have received an altered sequence of keystrokes, thus the hash value would ultimately be different to the hash value calculated in the client machine which in fact corresponds to the original sequence of keystrokes.

Moreover, in some embodiments, the web browser engine is further configured to obfuscate the code in the access web page so that it is more complex and cumbersome to understand and manipulate, yet the access web page keeps its functionality intact. In any case, a manipulated access web page would not affect the correct operation of the intermediary server since the access web page does not include any operation that may attack the server.

Another aspect of the disclosure relates to a method for providing secure access to a web page of a web-based service to a client terminal comprising a web browser, the method comprising:
receiving a request to provide, to the client terminal, secure access to the web page;
running an instance of a web browser engine;
producing an image of the web page upon rendering in the instance of the web browser engine; and
transmitting an access web page to the web browser, the access web page being configured to retrieve an image from the web browser engine, and to display the image in the web browser.

An instance of a web browser engine is run so as to retrieve the files of a requested web page. The files are rendered in the instance, and an image of the rendered web page is produced.

By transmitting an access web page to a client terminal, particularly to the web browser in which the requested web page is to be browsed, the web browser may have access to a secure version of the web-based service. The access web page is configured to download the image in the instance produced by the web browser engine, and to display it to the user by means of the web browser.

Transmitting an access web page which may be parsed and rendered in a web browser limits the access to possible malware to those parts of the client device and its operating system which are accessible by the web browser. Further, the possibility of browsing a secure version of a web page with the method disclosed herein is determined by the web browser in the client terminal: if the web browser may parse and render said access web page, then secure browsing is possible.

It could be unfeasible if, for example, said secure browsing were to be provided by means of an executable file instead of an access web page. First of all, the file would have to be compatible with the operating system; secondly, the client would require sufficient system privileges to execute or install the file or application; and lastly, during the execution of the process it would be in the memory of the system, so it could be potentially exploitable by malware directed to attack this process, which may be of concern for both the client and the server that provided the file to the client because, in an attempt to provide a safe manner of browsing websites, the client machine had become exposed to a new potential way of being breached.

Similar advantages as described for the first aspect of the disclosure may also be applicable to this aspect of the disclosure.

In preferred embodiments of the disclosure, the request for providing secure access is a request from a web server. In some other preferred embodiments of the disclosure, the request for providing secure access is a request from the client terminal.

A web server hosting a determined web-based service may benefit from users browsing the service in a secure manner, so the same web server may request secure access for a user which is trying to browse one of its hosted web pages. Particularly, malware that resides in the client equipment may tamper with the information introduced by the client in a form, hence negatively affecting the web server or service which should avoid at all cost any fraudulent operation. For example, the bank account number in a wire transfer made from a bank website may be replaced by another bank account number. So, in order to avoid fraudulent bank transactions, the web server may request to provide secure access to its service so that the client may safely browse the web pages in which sensitive information is to be introduced.

On the other hand, the user may also request said secure access so that he/she does not need to worry about possible malware present in the visited websites that may infect the user device.

In preferred embodiments of the disclosure, the access web page comprises JavaScript code or HTML code configured to load JavaScript code retrievable from the server.

In some embodiments, the method further comprises:
receiving keystrokes and mouse interactions detectable by the access web page;
sanitizing the keystrokes; and
inputting sanitized keystrokes and the mouse interactions in the instance of the web browser engine.

The access web page may register all the user input in the form of keystrokes and mouse interactions that occurs on said access web page. Said user input may then be used to interact with the web page. Moreover, in some embodiments the keystrokes of the user input may be sanitized so the web-based services that may demand being visited in a secure manner are less prone to being exploited. That is, particular characters and/or text sequences or strings may be suppressed or replaced by other characters so that techniques such as SQL injection, which consist in SQL statements tailored to exploit vulnerabilities of database, become less effective.

In some embodiments of the disclosure, the method further comprises:
detecting changing portions of the web page in the instance of the web browser engine; and
producing images of the changing portions.

Also, the access web page is further configured to retrieve the images of the changing portions from the web browser engine, and to replace portions of the image displayed in the web browser with the images of the changing portions.

In preferred embodiments, the method further comprises running at the server a new instance of the web browser engine for each request, received at the server, for providing secure access to a web page of a web-based service.

In preferred embodiments of the disclosure, the instance and each new instance of the web browser engine is created upon reception of the request to provide secure access to a web page of a web-based service.

In preferred embodiments, the web-based service is available on the Internet, that is, web pages providing the web-based service are hosted on web servers with Internet connectivity.

In some embodiments, the method further comprises:
downloading a file from a server or receiving a file from the client terminal; and
scanning the file for virus and/or malware.

In some of these embodiments, the method further comprises, wherein scanning the file has not detected any virus or malware, serving the downloaded file to the client terminal or the uploaded file to the server. In some other embodiments, the method further comprises, wherein scanning the file has detected a virus or malware, providing a virus and/or malware free version of the file and serving it to the client terminal or server.

When the access web page transmits—to the intermediary server—a keystroke and/or mouse interaction of the user that corresponds to downloading a file, the intermediary server first downloads the file, checks whether it is free of virus and/or malware, and serves the file downloaded at the intermediary server to the client terminal. Such file, which may be considered a downloadable file, may be any of, for example, audio—e.g. mp3, way, ogg, wma, etc.—, image—e.g. jpg, bmp, gif, png, etc.—, video—e.g. mp4, avi, mkv, fly, etc.—, document—e.g. doc, docx, pdf, rtf, txt, etc.—, compressed—e.g. zip, 7z, rar, etc.—, and virtually any other file format including executable files. To this end, the access web page is configured to download the file that is served by the intermediary server.

When the intermediary server detects malicious content within the file, the server may attempt to remove—with antivirus and antimalware software solutions—such content so as to provide a clean version of the file, which is then served to the client terminal. When the downloadable file is compressed and includes several files, all the compressed files may be analyzed and cleaned prior to serving the downloadable file.

In any case, the web browser engine may be configured to allow or forbid downloading/uploading files, and/or only allow downloading/uploading files with particular file formats.

Similarly, the user may upload or submit files in some web-based services, for instance, during the attachment of files to an email, or storage of photos in a cloud service. When this web-based service is being browsed through the intermediary server, the server may also scan the files so as to prevent the web server of the web-based service of getting infected with virus, malware, and the like.

The method disclosed herein may also check whether the user's web browser is infected. In this regard, in some embodiments of the disclosure the method further comprises:
calculating a first hash value of a fragment or the totality of the code of the access web page prior to transmitting the access web page to the web browser;
receiving the fragment or the totality of the code of the access web page from the web browser;
calculating a second hash value of the received code of the access web page; and
comparing the first hash value with the second hash value.

In some embodiments, the access web page is further configured to calculate a first hash value of a sequence of keystrokes, and the method further comprises:
calculating a second hash value of a sequence of keystrokes received from the client terminal detectable by the access web page; and
comparing the first hash value with the second hash values.

In some embodiments, the method further comprises obfuscating the code of the access web page prior to transmitting the access web page to the web browser.

Another aspect of the disclosure relates to a computer program comprising computer program code means adapted to perform the steps of a method according to the second aspect of the disclosure when said program is run on a computer, a digital signal processor, a field-programmable gate array, an application-specific integrated circuit, a microprocessor, a micro-controller, or any other form of programmable hardware.

A fourth aspect of the disclosure relates to a computer-readable memory or medium that stores program instructions or code for performing a method according to the second aspect of the disclosure.

BRIEF DESCRIPTION OF THE DRAWINGS

To complete the description and in order to provide for a better understanding of the disclosure, a set of drawings is provided. Said drawings form an integral part of the description and illustrate an embodiment of the disclosure, which should not be interpreted as restricting the scope of the disclosure, but just as an example of how the disclosure can be carried out. The drawings comprise the following figures.

DETAILED DESCRIPTION

Figure 1:
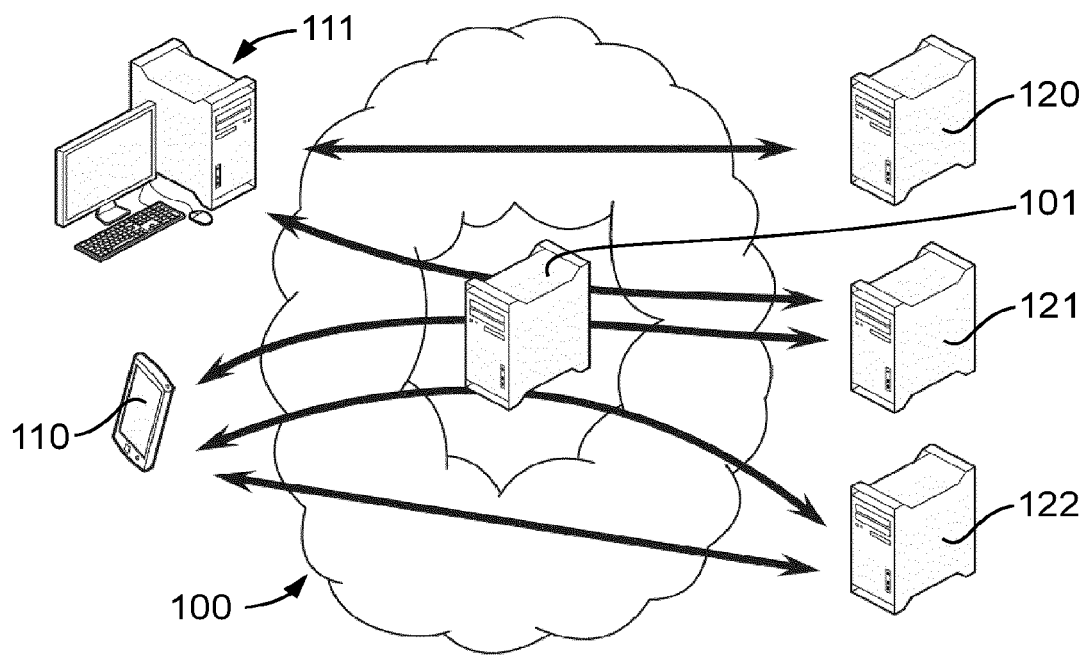
FIG. 1 is a schematic representation of possible connections between user equipment and web servers using an intermediary server according to the disclosure.

FIG. 1 schematically shows possible ways of browsing web pages of web-based services on the Internet 100 depending on the configuration of each web server 120-122.

An intermediary server 101 for providing secure access to web pages is connected to the Internet 100. A first user may browse web pages of any of web servers 120-122 with a cellphone 110 comprising a web browser, and a second user may do similarly with a personal computer PC 111.

A first web server 120 is configured to allow direct connections of the client equipment with the web server 120, thus the client machine may be exposed to any malware present in the web server 120. Even though it is not illustrated with arrows, the user may request to the intermediary server 101 for secure access to any web server, including web server 120. So, in this case, the requests for secure access would be originated by the user terminal rather than the web server 120.

A second web server 121 is configured to request secure access to all of the web pages it hosts when a client's web browser, like the ones in cellphone 110 or in PC 111, attempts to connect to any web page hosted in the web server 121. The intermediary server 101 runs an instance of a web browser engine, retrieves the files from the particular web page, renders and produces an image of the web page so that the client machine may browse a secure version of the web page. An exemplary web server 121 may be a cloud-based-only service wherein the splash screen is basically a login form to log in the service.

Lastly, a third web server 122 is configured to have specific web pages browsed in a secure manner, that is, through the intermediary server 101, whereas other web pages may be visited directly. This may correspond, for example, to the web server of a bank website in which a first part of the website is informative, namely it is devoted to advertising services offered by the bank, whereas a second part is a network for clients where it is possible to make bank transactions; the first part may be directly shown to the user because no sensitive information is to be introduced or shown, and the second part can only be accessed through the intermediary server 101. In this sense, the web server may be configured to request the use of the intermediary server 101 to access specific web pages.

Figure 2:
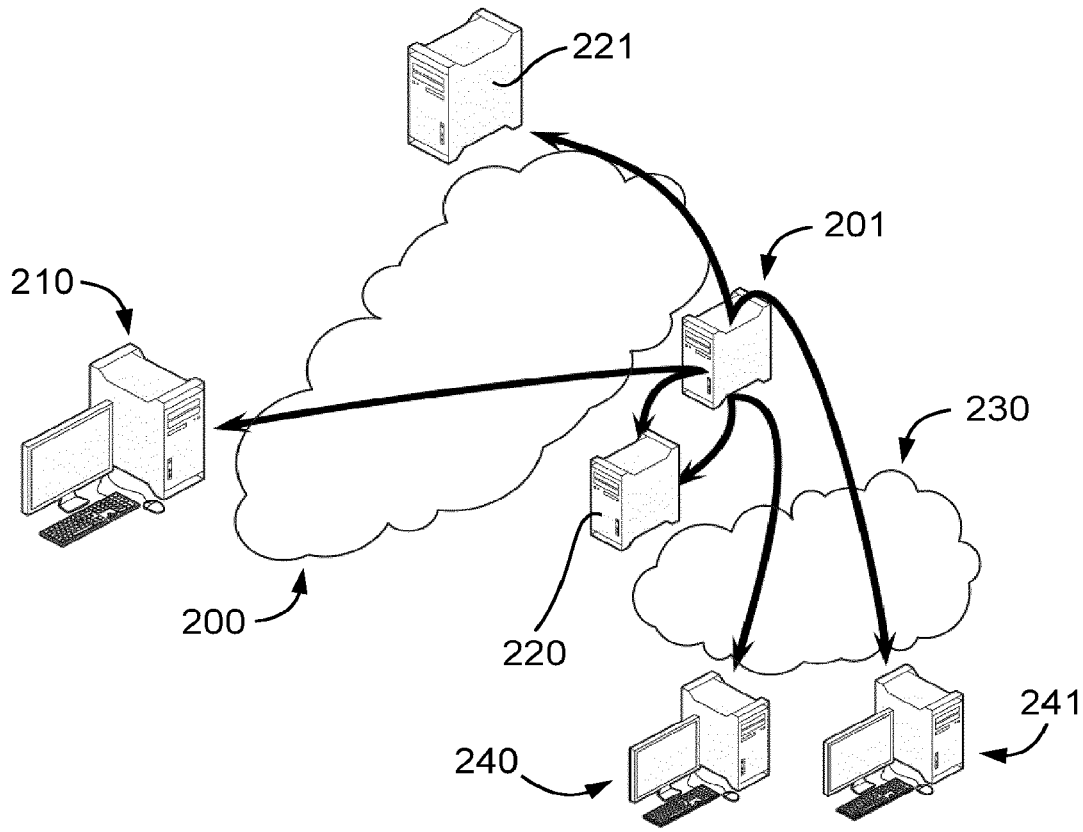
FIG. 2 is another schematic representation of possible connections between user equipment and web servers using an intermediary server according to the disclosure.

FIG. 2 shows a representation of different user terminals which may be used for visiting web pages of web servers 220-221 and which connect to the intermediary server 201 over different networks. The intermediary server 201 is within the same local area network 230 than web server 220, and belongs to a company.

An employee of the company wants to read his/her email from a web mail application in web server 220, however the employee is at home and is using his/her personal computer 210 connected to the Internet 200. The web browser in the PC 210 retrieves an access web page from the intermediary server 201, over the Internet 200, which enables him/her to browse the webmail service from web server 220 in a secure manner.

A second employee in the office intends to check his mail through the webmail application as well, so his/her PC 240 establishes a connection with the intermediary server 201 over the local area network 230 of the office. Although the PC 240 is managed by an IT manager and is, in principle, virus and malware free, he may have been infected anyway, so checking his email account with the intermediary server 201 protects his/her emails from being tampered with and stored in a text form.

Similarly, a third employee needs to browse a web page on a remote web server 221. The employee is not aware that web server 221 is infected and any malware that is downloaded to his PC 241 in the office may propagate across the LAN 230, thereby infecting other computers within the same local area network 230. The PC 241 has been configured to browse web pages from any web server, including web server 221, through intermediary server 201. So the web browser in PC 230 downloads an access web page from the intermediary server 201 over the LAN 230, and the intermediary server 201 downloads the original web page from web server 221 over the Internet 200. The intermediary server 201 produces images of the rendered web pages which may then be retrieved by the access web page in PC 230.

Figure 3:
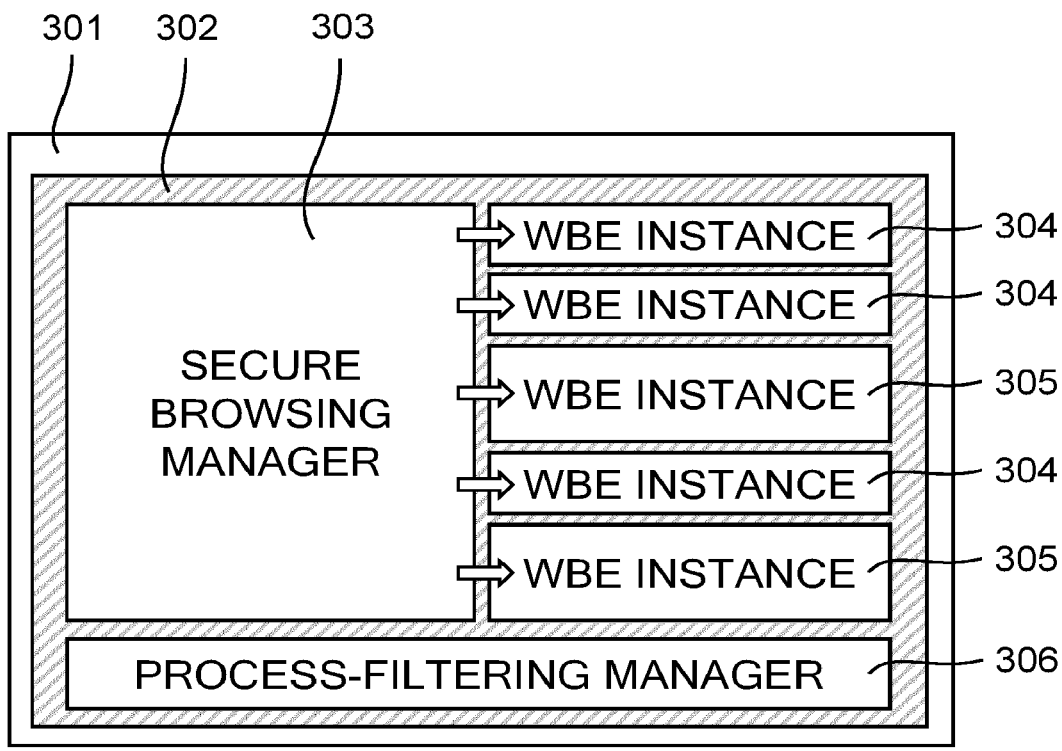
FIG. 3 is an intermediary server in accordance with an embodiment of the disclosure.

FIG. 3 is a representation, in a block diagram form, of an intermediary server 301 in accordance with an embodiment of the disclosure.

The intermediary server 301 has Internet connectivity and comprises an operating system 302 configured to run one or more instances 304-305 of a web browser engine which may render web pages of web-based services that are retrievable, for instance from the Internet, so as to serve secure versions of web pages to client terminals. The operating system 302 comprises a secure browsing manager 303 which is a software running as a service in the operating system 302. The manager 303 acts as a web server and, thus, listens to a port associated with HTTP requests (typically ports 80 and 443, but it may be configured to other port numbers as well) for incoming web requests. Upon arrival of a request, the secure browsing manager 303 may initiate (i.e. launch) a new web browsing engine instance 304-305 that is run by the operating system 302, transmit an access web page for secure browsing to the client terminal associated with the instance, manage the communications between the client terminal (e.g. transmit images of rendered web pages, receive user input, transmit and receive files to be downloaded or uploaded, etc.) and its instance, adjust the compression, quality, and/or image file format of produced images, etc. The secure browsing manager 302 may also adjust how the intermediary server serves updates to the client terminal based on information gathered during the user session, that is, the manager 302 may assess the latency and/or bandwidth in the communications with the client terminal and modify parameters such as the quality of the images, update rate, etc. that may improve the user experience. Therefore the secure browsing manager 303 may manage and monitor any existing instances 304-305 of the web browsing engine and initiate new ones.

Each instance 304-305 is isolated from the other ones so that any malicious attack affecting a particular instance is confined to that instance. To this end, the operating system 302 comprises a process-filtering manager 306 in the kernel controlling the process running in the operating system 302, and also monitoring whether any process attempts to be launched. The process-filtering manager 306 detects the execution of any new application and checks whether it has permission to do so, namely check if it is whitelisted, and allow or block it. In some cases, an application may be whitelisted when certain conditions are met, for instance the execution is conditioned to whether the instruction of launching the process originated in a process different from the web browser engine, or if the directory where the executable file is stored is or is not a temporary folder. In addition, the secure browsing manager 302 is configured to create a temporary directory upon initiation of each instance 304-305 of the web browser engine so as to further isolate the instances: each instance may only access its respective temporary directory and, in some cases, other particular directories. An instance may, for instance, store files downloaded from web servers, cache files, or files transmitted from the client machine to the intermediary server 301.

Some instances 304 may be dedicated to browsing one web page at a time so as to enhance the isolation among concurrent sessions or users, whereas some other instances 305 may browse several web pages at once (in a same session by a same user) so as to share content such as cookies or session information.

Figure 4:
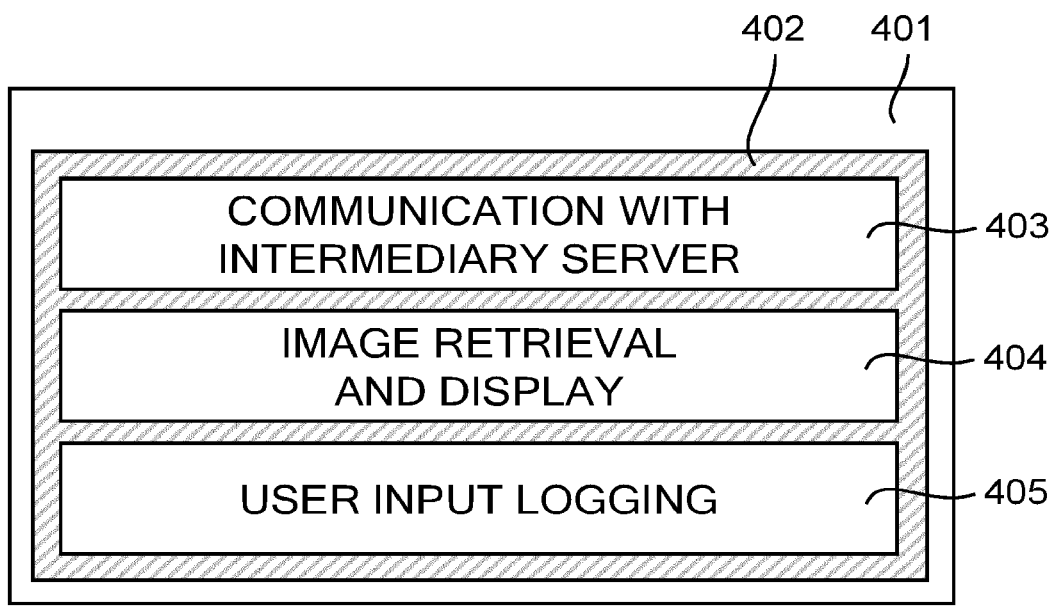
FIG. 4 is an access web page in accordance with an embodiment of the disclosure.

FIG. 4 shows an access web page 401 in accordance with an embodiment of the disclosure.

The access web page 401 is generated by an intermediary server such as the one depicted in FIG. 3, and is transmitted to a user terminal so that, once it is loaded in the user's web browser, the user may have access to secure versions of web pages.

In particular, the access web page 401 comprises JavaScript code 402 which is configured to perform the following tasks: communicating with the intermediary server 403; retrieving any images that the intermediary server may have produced and display them in the web browser of the user 404; and registering any keystrokes and/or mouse interactions/events of the user 405 and transmitting this user input to the intermediary server.

In what regards communicating with the intermediary server 403, the access web page 401 may reuse an already-established communication with the intermediary server, for instance the one established during the initial data transmission for requesting safe access to a web page or downloading the access web page, or establish a new one. Said communication may not be a physical dedicated connection link or the like, it may for instance rely on datagrams, and in some embodiments may also use the HTTPS protocol that cyphers the exchanged data.

Among the images that the access web page 401 may retrieve 404 from the intermediary server, images corresponding to changing portions of the web page rendered in the instance of the intermediary server may also be downloaded to the client's web browser. To this end, the JavaScript code 402 may be configured to replace parts of an image already displayed in the client's web browser with images of changing portions: the user will be able to see the web page as currently displayed in the intermediary server without downloading a complete image of the rendered web page, thus improving the bandwidth usage and responsiveness of the access web page 401.

In some embodiments, JavaScript code 402 is not embedded in the access web page 401, instead it is retrieved separately from the intermediary server and run by the access web page 401.

Figure 5A:
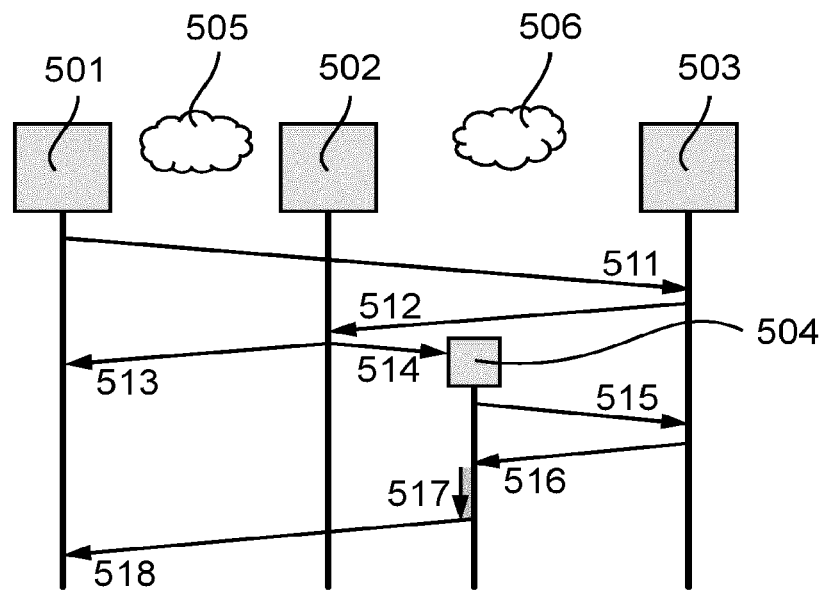
FIGS. 5A-5B are diagrams showing the communication between user equipment and intermediary server in accordance with embodiments of the disclosure.

FIG. 5A is a diagram showing the evolution of the connections between the web browser 501 of a client machine, an intermediary server 502 comprising a web browser engine, and a web server 503. Particularly, the web browser 501 may communicate with the intermediary server 502 over a first network 505, and the intermediary server 502 may communicate with the web server 503 over a second network 506.

The client loads a URL in the address bar of the web browser 501 which belongs to the web server 503, so it first attempts to connect 511 to the web server either using HTTP or HTTPS protocol. The web server 503 is configured to use the intermediary server 502 for securing the access to the web server, so it transmits a request 512 to the intermediary server 502 and reroutes the user connection. The intermediary server 502, in turn, transmits an access web page 513 to the client's web browser 501 and creates 514 an instance 504 of the web browser engine. The instance 504 establishes a connection 515 with the web server 503 and downloads 516 the files of the web page. Then, the instance 504 renders the files and produces an image of the web page 517 which is retrieved 518 by the access web page loaded in the web browser 501 of the client.

Figure 5B:
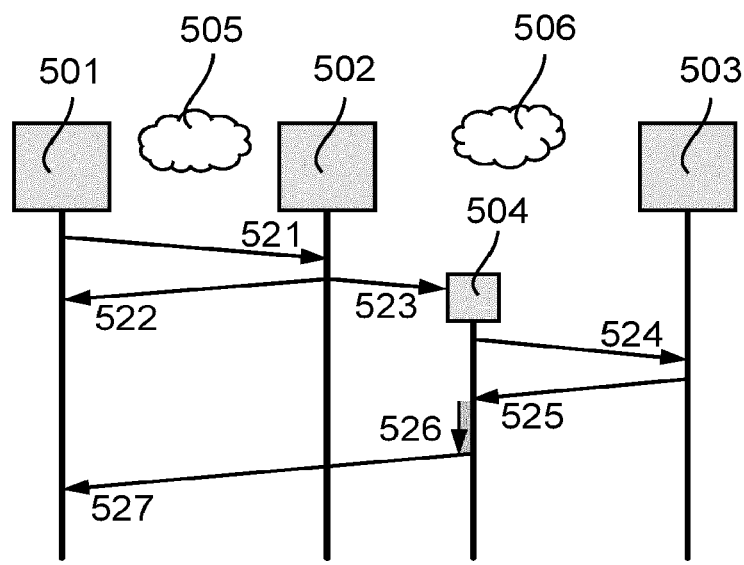

Similarly, FIG. 5B shows another diagram in which the user loads a URL in the web browser which corresponds to a web page browsed via the intermediary server 502, that is, the URL identifies the web page to be visited through the intermediary server 502. Therefore the client machine is requesting the secure access to the web page. The web browser 501 directly connects 521 with the intermediary server 502 that sends an access web page 522 to the client and initiates 523 a new instance 504 of the web browser engine. The instance 523 then connects 524 to the web server 503 so as to download 525 the web page files. Finally, the image of the rendered web page is produced 526, and said image is retrieved 527 by the access web page so the client may safely browse the requested web page.

In this text, the term "comprises" and its derivations (such as "comprising", etc.) should not be understood in an excluding sense, that is, these terms should not be interpreted as excluding the possibility that what is described and defined may include further elements, steps, etc.

The disclosure is obviously not limited to the specific embodiment(s) described herein, but also encompasses any variations that may be considered by any person skilled in the art (for example, as regards the choice of materials, dimensions, components, configuration, etc.), within the general scope of the disclosure as defined in the claims.

What is claimed is:

1. An intermediary server for providing secure access to webpages, the intermediary server comprising:
   at least one processor; and
   an operating system running an instance of a web browser engine, wherein a web server requests access to a web page of a web-based service to a client terminal;
   the web browser engine executed by the at least one processor to:
      produce an image of the web page rendered in the instance of the web browser engine, and
      transmit an access web page to a web browser of the client terminal; and
   the access web page:
      retrieves the image from the web browser engine,
      displays the image in the web browser,
      registers user interactions,
      calculates a first hash value of a fragment or a totality of an access web page code before transmitting the access web page to the web browser,
      receives the fragment or the totality of the access web page code from the web browser, calculates a second hash value of the received access web page code,
compares the first hash value with the second hash value to identify a difference between the first hash value and the second hash value, and
sends the user interactions to the instance in the intermediary server, wherein:
the user interactions are reproduced within the instance,
the instance produces images of the web page after each of the user interactions,
the instance replicates the user interactions,
the instance comprises the access web page, and
by replicating the user interactions, the web page is browsed within the instance and rendered again for the client terminal.

2. The intermediary server of claim 1, wherein clicking on a hyperlink, arrows of scrollbar, or filling a form, mouse and keyboard events are registered as the user interactions by the access web page and sent to the instance in the intermediary server.

3. The intermediary server of claim 1, wherein the access web page comprises JavaScript code or HTML code executed to load JavaScript code retrievable from the intermediary server.

4. The intermediary server of claim 1, wherein the operating system runs a new instance of the web browser engine for each request to provide the secure access to the web page of the web-based service.

5. The intermediary server of claim 1, wherein the web browser engine communicates with the web browser using HTTPS protocol.

6. The intermediary server of claim 1, wherein a fragment or a totality of an access web page code is transmitted to the intermediary server where a hash function is applied to the access web page code.

7. A method for providing secure access to webpages, the method comprising:
receiving a request from a web browser to provide, to a client terminal, the secure access to a web page of a web-based service, wherein the request for providing the secure access is a request from a web server; and
characterized by:
running an instance of a web browser engine;
producing an image of the web page upon rendering in the instance of the web browser engine; and
transmitting an access web page to the web browser, the access web page being configured to:
retrieve the image from the web browser engine,
display the image in the web browser,
register user interactions,
calculate a first hash value of a fragment or a totality of an access web page code before transmitting the access web page to the web browser,
receive the fragment or the totality of the access web page code from the web browser,
calculate a second hash value of the received access web page code,
compare the first hash value with the second hash value to identify a difference between the first hash value and the second hash value, and
send the user interactions to the instance in an intermediary server,
wherein:
the user interactions are reproduced within the instance,
the instance produces images of the web page after each of the user interactions to form a rendered web page,
the instance replicates the user interactions,
the instance comprises the rendered web page, and
by replicating the user interactions, the web page is browsed within the instance and rendered again for the client terminal.

8. The method of claim 7, further comprising:
downloading a file from a server or receiving a file from the client terminal; and scanning the file for virus and/or malware.

9. The method of claim 8, further comprising:
scanning the file has not detected any virus or malware; and
serving the downloaded file to the client terminal or an uploaded file to the server.

10. The method of claim 8, further comprising:
scanning the file has detected a virus or malware, providing a virus and/or malware free version of the file and serving it to the client terminal or the server.

11. The method of claim 7, wherein the access web page comprises JavaScript code or HTML code executed to load JavaScript code retrievable from the intermediary server.

12. The method of claim 7, wherein an operating system runs a new instance of the web browser engine for each request to provide the secure access to the web page of the web-based service.

13. The method of claim 7, wherein clicking on a hyperlink, arrows of scrollbar, or filling a form, mouse and keyboard events are registered as the user interactions by the access web page and sent to the instance in the intermediary server.

14. The method of claim 7, wherein an operating system is executed to run the instance of the web browser engine for each request to provide the secure access to the web page of the web-based service to the client terminal.

15. The method of claim 14, the web browser engine creates at least one temporary directory in the operating system for each of the instance and any new instance of the web browser engine, and to permit access to the instance and the any new instance to its respective at least one temporary directory of the operating system.

16. The method of claim 7, the web browser engine communicates with the web browser using HTTPS protocol.

17. A computer program comprising computer program code means adapted to perform the steps of the method according to claim 7, when the program is stored in a non-transitory computer-readable medium and run on a computer, a digital signal processor, a field-programmable gate array, an application-specific integrated circuit, a microprocessor, a micro-controller, or any other form of programmable hardware.

18. A non-transitory computer-readable memory or non-transitory computer-readable medium that stores program instructions of code for performing the method according to claim 7 using a processor.

\* \* \* \* \*